United States Patent
Nogues et al.

(10) Patent No.: US 11,673,429 B2
(45) Date of Patent: Jun. 13, 2023

(54) SHOE INTERFACE WEAR INDICATOR

(71) Applicant: Evident Canada, Inc., Québec (CA)

(72) Inventors: Dominique Nogues, Québec (CA); Micael Bédard-Houde, Québec (CA); Rémi Leclerc, Quebec (CA)

(73) Assignee: Evident Canada, Inc., Québec (CA)

( * ) Notice: Subject to any disclaimer, the term of this patent is extended or adjusted under 35 U.S.C. 154(b) by 263 days.

(21) Appl. No.: 17/000,508

(22) Filed: Aug. 24, 2020

(65) Prior Publication Data
US 2022/0057366 A1 Feb. 24, 2022

(51) Int. Cl.
*B60C 11/24* (2006.01)
*G01N 29/265* (2006.01)
*G01M 13/00* (2019.01)

(52) U.S. Cl.
CPC ............. *B60C 11/24* (2013.01); *G01M 13/00* (2013.01); *G01N 29/265* (2013.01)

(58) Field of Classification Search
CPC ........ G01N 27/90–9093; G01N 29/265; B60C 11/24–246
USPC ....................................................... 324/239
See application file for complete search history.

(56) References Cited

U.S. PATENT DOCUMENTS

| | | | | |
|---|---|---|---|---|
| 4,258,319 A | * | 3/1981 | Shimada | G01N 27/9046 324/225 |
| 2009/0114322 A1 | * | 5/2009 | O'Brien | B60C 11/24 156/244.18 |
| 2017/0356515 A1 | | 12/2017 | Kinkley | |

FOREIGN PATENT DOCUMENTS

| | | | | |
|---|---|---|---|---|
| AU | 2016301099 | | 1/2018 | |
| FR | 2665768 | | 2/1992 | |
| FR | 2927391 | | 8/2009 | |
| JP | 2012218628 A | * | 11/2012 | ............. B60C 11/24 |
| WO | WO-2017123112 A1 | * | 7/2017 | ........... G01N 29/043 |

OTHER PUBLICATIONS

"International Application Serial No. PCT CA2021 051153, International Search Report dated Nov. 18, 2021", 3 pgs.
"International Application Serial No. PCT CA2021 051153, Written Opinion dated Nov. 18, 2021", 6 pgs.

* cited by examiner

*Primary Examiner* — Lee E Rodak
*Assistant Examiner* — Rahul Maini
(74) *Attorney, Agent, or Firm* — Schwegman Lundberg & Woessner, P.A.

(57) ABSTRACT

A shoe for analyzing a component is provided. The shoe includes a housing, a NDT probe disposed on a side of the housing, and a shoe interface. The shoe interface is disposed at the side of the housing and contacts the component during the analyzing of the component. The shoe interface separates the NDT probe from the component during the analyzing of the component and moves along the component during the analyzing of the component. The shoe also includes first and second wear indicators. The first wear indicator indicates that the shoe interface is usable during the analyzing of the component. The second wear indicator indicates that the shoe interface should be replaced. Both of the wear indicators are configured similar to the shoe interface and move along the component while the shoe analyzes the component.

23 Claims, 6 Drawing Sheets

SHOE INTERFACE WEAR INDICATOR

TECHNICAL FIELD

This document pertains generally, but not by way of limitation, to a shoe for use with a non-destructive testing (NDT) inspection device that can be used to analyze a component. More specifically, but not by way of limitation, the present application relates to a wear indicator for a shoe that can be used in support of analysis of a component.

BACKGROUND

Eddy current testing (ECT) is used for a variety of components that require non-destructive testing. For example, components that are used for aerospace applications, such as fuselages and airplane wings, along with components in the petrochemical industry, such as metal piping and other alloy tubing, require analysis to detect for potential safety-related or quality-related problems. ECT can be used to detect cracks in the metal sheets and tubing along with identifying corrosion under a metal surface. Furthermore, ECT may be used to monitor the effects of heat treatment on a component along with determining a thickness of a nonconductive coating over conductive coatings.

Typically, ECT requires an eddy current probe, which generates an oscillating magnetic field that is created by alternating current flow through a wire coil. When the eddy current probe is brought close to a conductive material, such as a metal fuselage, an eddy current moves through the conductive material. Changes in the metal thickness or any defects in the metal thickness alter the amplitude and pattern of the eddy current along with the resulting magnetic field. The altered amplitude and pattern of the eddy current varies an impedance in the wire coil of the eddy current probe, which can be used by an operator to identify changes and/or defects in the component.

In order to preserve the functionality of the eddy current probe, the eddy current probe should be spaced apart from the component during analysis of the component. Typically, spacers are used to separate the eddy current probe from the component while at the same time allowing the eddy current probe to remain close enough to the component to perform a proper analysis. For example, the interface may move along the component during ECT with the eddy current probe. However, the interface may wear down to the point that the eddy current probe may begin to contact the component during analysis of the component. Contact between the eddy current probe and the component may lead to premature wear of the eddy current probe.

SUMMARY

What is needed is a shoe that minimizes the possibility of an eddy current probe from contacting a component during analysis of the component. Moreover, the shoe should provide an indication to a user that an interface of the shoe that separates an eddy current probe from a component while at the same time allowing analysis by the eddy current probe should be replaced.

Examples of the present disclosure solve the problems noted above by providing a wear indicator for an interface of a shoe that analyzes a component. In an implementation, the shoe can include a housing, a non-destructive testing (NDT) probe disposed at a side of the housing, and a shoe interface disposed at the side of the housing. The shoe can also include a first wear indicator and a second wear indicator. In an implementation, the NDT probe can analyze the component while at the same time remaining separated from the component. In an implementation, the shoe interface can contact the component during the analysis while at the same time spacing the NDT probe from the component. The shoe interface can have a cylindrical configuration and move along the component as the NDT probe analyzes the component. The first and second wear indicators can provide a visual indication regarding whether or not the shoe interface should be replaced or otherwise services. For example, if only the first wear indicator is visible, then the shoe interface may be used for additional analyses, e.g., the shoe interface does not need to be replaced or otherwise serviced. In an implementation, if the second wear indicator is visible, the visibility of the second wear indicator indicates that the shoe interface should be replaced or otherwise serviced.

In an implementation, the first wear indicator can be a first color and the second wear indicator can be a second color different from the first color. Furthermore, the first wear indicator can be disposed above the second wear indicator such that only the first wear indicator can be visible when the shoe interface is usable during the analyzing of the component. In an implementation, the shoe interface can be formed from a first material having a first hardness and each of the first wear indicator and the second wear indicator can be formed from a second material having a second hardness that can be less than the first hardness of the first material.

DETAILED DESCRIPTION

Examples of the present disclosure solve the problems noted above by providing a wear indicator for an interface of a shoe that analyzes a component. In an implementation, the shoe can include a housing, an NDT probe disposed at a side of the housing, and a shoe interface disposed at the side of the housing. The shoe can also include a first wear indicator and a second wear indicator. In an implementation, the NDT probe can analyze the component while at the same time remaining separated from the component. In an implementation, the shoe interface can contact the component during the analyzation while at the same time spacing the NDT probe from the component. The shoe interface can have a cylindrical configuration and move along the component as the NDT probe analyzes the component. The first and second wear indicators can provide a visual indication regarding whether or not the shoe interface should be replaced. For example, if only the first wear indicator is visible, then the shoe interface may be used for additional analyses, e.g., the shoe interface does not need to be replaced. In an implementation, if the second wear indicator is visible, the visibility of the second wear indicator indicates that the shoe interface should be replaced.

Figure 1:
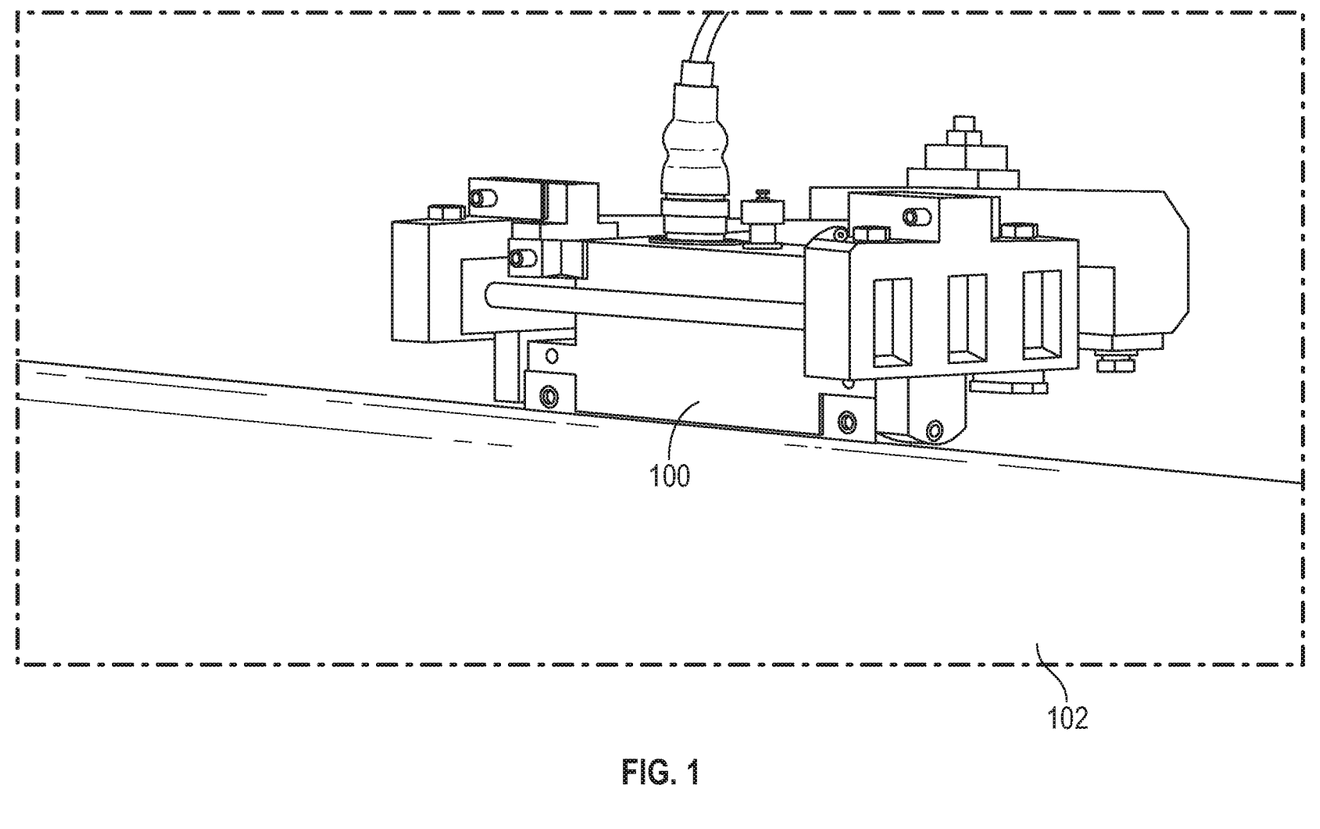
FIG. 1 illustrates an environmental view of a shoe, in accordance with examples of the present disclosure.

Now making reference to the Figures, and more specifically FIG. 1, an environment in which a shoe 100 is used to inspect a component 102 is shown in accordance with an implementation of the present disclosure. While the component 102 is shown as a pipe in FIG. 1, the component 102 may be any component such as, but not limited to, a pressure vessel, an aircraft wing, an aircraft fuselage, railway rail, a railcar wheel, a maritime or other vessel hull, or any other type of component. Moreover, the component 102 may be formed from any type of material, including but not limited to steel, aluminum, metal alloys, polymers (in part), or the like. In an implementation, the shoe 100 can be capable of performing any number of tests on the component 102, such as a weld inspection, conductivity testing, surface inspection, corrosion detection, bolt hole inspection, tubing inspection, and the like.

Figure 2:
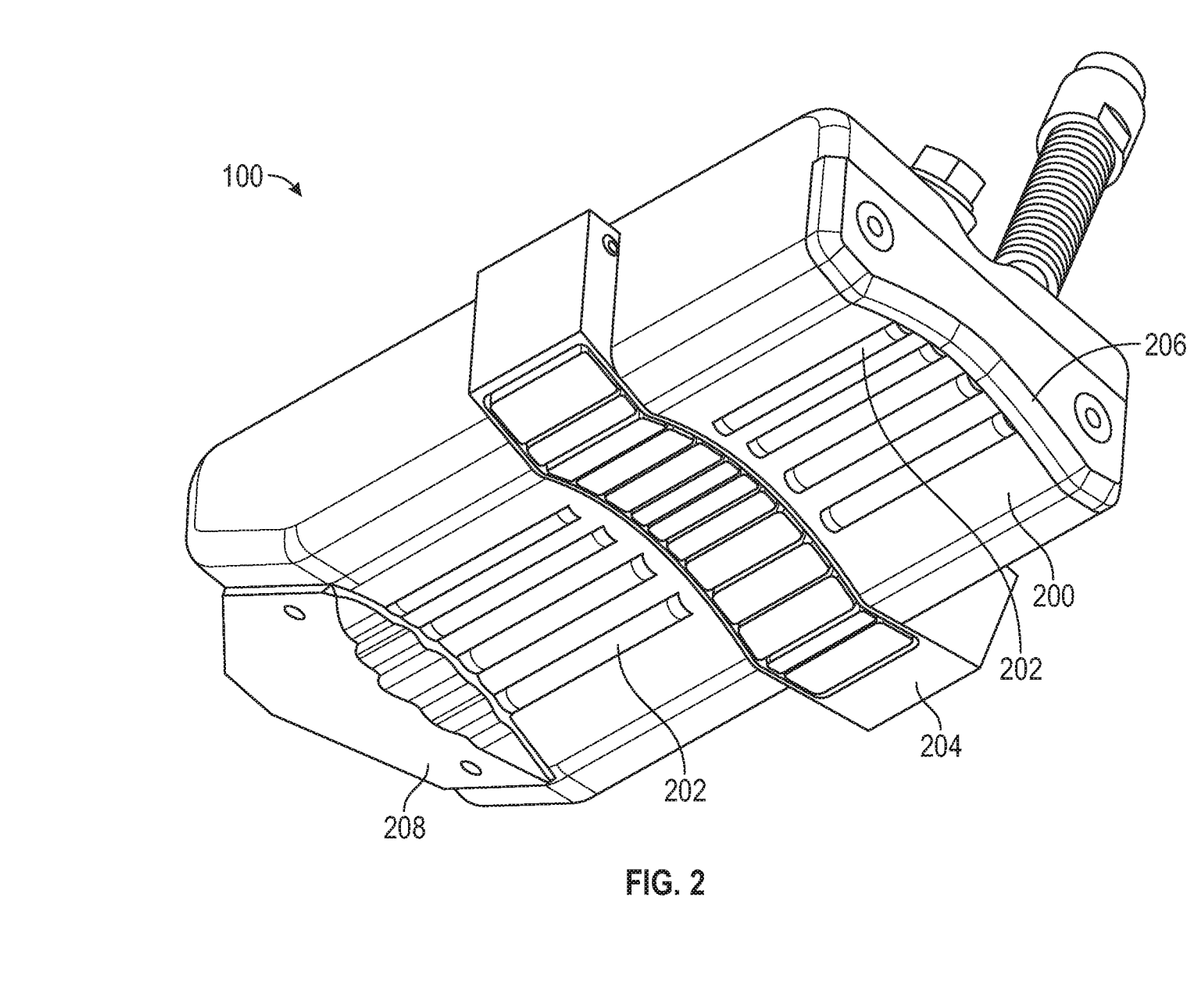
FIG. 2 illustrates a perspective view of the shoe with reference to FIG. 1, in accordance with examples of the present disclosure.

The shoe 100 can include a housing 200 having a side on which shoe interfaces 202 can reside, as shown with reference to FIG. 2. Throughout the Specification, reference will be made to a shoe interface 202 and shoe interfaces 202. It should be noted that each of the terms are interchangeable. The housing 200 can be formed with a 3D printing procedure where the housing 200 is formed from nylon. The housing 200 can be formed using other techniques, such as casting, injection molding, or any other suitable technique. The housing 200 can also be formed from any type of metal alloy, a thermoplastic, or any other type of rigid material along with any materials suitable for three-dimensional printing The shoe interfaces 202 can have a cylindrical configuration, as shown with reference to FIG. 3. A shoe interface 202 of the shoe interfaces 202 can include a body 300 having a cylindrical configuration, which can be formed of carbide. However, it should be noted that in addition to a cylindrical configuration, the body 300 can have a square or triangular configuration. In addition to carbide, the body 300 may also be formed of metal alloys, such as steel, iron, plastic materials including polyethylene, polyamide nylon, polyether ether ketone, or the like. In an implementation where the body 300 has a cylindrical configuration, the body 300 can have a diameter in a range of about 3.0 mm to about 7.0 mm. Moreover, the body 300 can have a diameter of about 6.3 mm. In addition to the body 300, the shoe interface 202 can have a wear indicator 302 and a wear indicator 304. In an implementation, the wear indicators 302 and 304 can be disposed at an end of the body 300. In accordance with implementations of the present disclosure, the wear indicators 302 and 304 can be disposed at any position relative to the body 300, such as at a middle portion of the body 300 or at any location between ends 306 and 308 of the body 300. It should be noted that while embodiments having two wear indicators are disclosed, the shoe interface can have any number of wear indicators, such, as three, four, or five where the wear indicators can have the features of the wear indicators 302 and 304 described herein.

Figure 3:
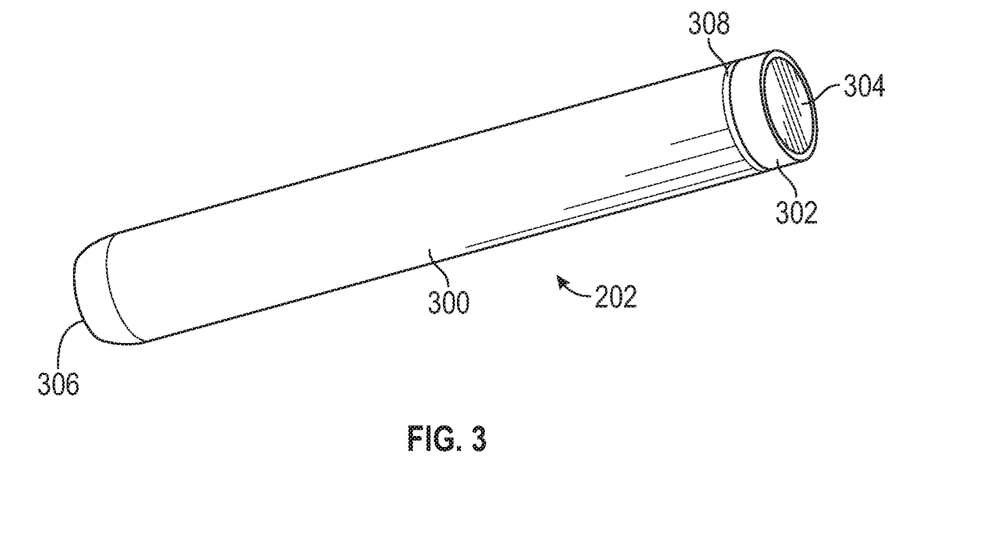
FIG. 3 illustrates a perspective view of a shoe interface of the shoe shown with reference to FIG. 2, in accordance with examples of the present disclosure.

Each of the wear indicators 302 and 304 can be formed of a material that is softer than the material used to form the body 300. In other words, a material hardness of the body 300 can be greater than a material hardness of the wear indicators 302 and 304. In an implementation, the wear indicators 302 and 304 can each be formed of plastic, nylon, or an alloy having a hardness that is less than a hardness of the body 300. Therefore, as a surface of the body 300 erodes during use of the shoe 100, the wear indicators 302 and 304 will also erode.

Figure 4:
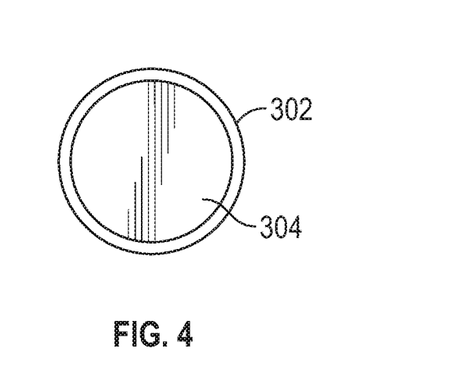
FIGS. 4-6 illustrate wear indicators of the shoe interface of FIG. 3, in accordance with examples of the present disclosure.
Figure 5:
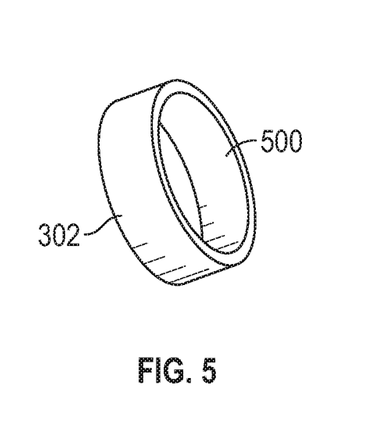
Figure 6:
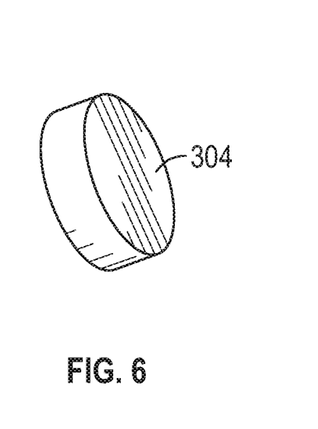

In an implementation, the wear indicators 302 and 304 function to inform an operator of the shoe 100 when the shoe interface 202 should be replaced. In an implementation, the shoe interface 202 should be replaced when the body 300 erodes due to use of the shoe 100. In an implementation, the body 300 and the wear indicators 302 and 304 can erode when the shoe 100 is used to analyze the component 102 due to friction that can occur between the shoe interfaces 202 and the component 102 caused by the shoe interface 202 contacting and moving over a surface of the component 102. In an implementation, the wear indicator 302 can be formed about the wear indicator 304, as more clearly shown with reference to FIG. 4. Thus, in an implementation, the wear indicator 302 erodes before the wear indicator 304 since the wear indicator 302 is disposed about and covers the wear indicator 304. In an implementation, the wear indicator 302 has a hollow portion 500 as shown with reference to FIG. 5 such that the wear indicator 304 can fit within the hollow portion 500. Moreover, in an implementation, the wear indicator 304 has a configuration that is complementary to the hollow portion 500 such that the wear indicator 304 can fit within the hollow portion 500. For example, the hollow portion can have a circular configuration as shown with regards to FIG. 5 and the wear indicator 304 can have a complementary circular configuration as shown with reference to FIG. 6 such that the wear indicator 304 can fit within the wear indicator 302. Thus, the wear indicator 302 erodes prior to erosion of the wear indicator 304.

Figure 7:
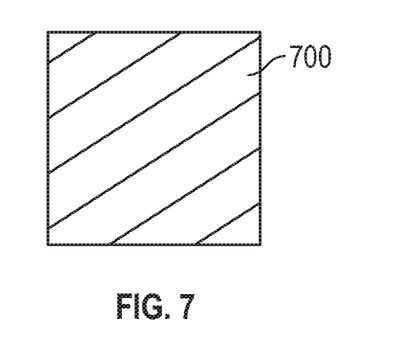
FIGS. 7 and 8 illustrate patterns for the wear indicators shown with reference to FIGS. 4-6, in accordance with examples of the present disclosure.
Figure 8:
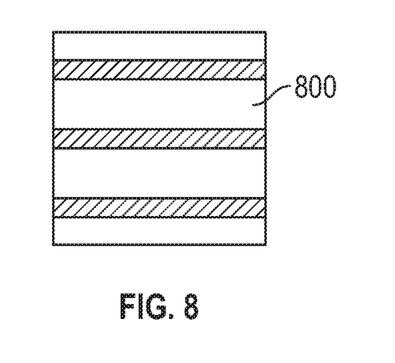

In an implementation, the wear indicator 302 can be formed of a first color, such as green, while the wear indicator 304 can be formed of a different color, such as red. It should be noted that while the wear indicators 302 are described as having first and second colors, the wear indicator 302 can have a first indicator and the wear indicator 304 can have a second indicator that is different from the first indicator. For example, the first indicator can have a pattern 700 as shown with reference to FIG. 7 while the second indicator can have a pattern 800 that is different from the pattern 700, as shown with reference to FIG. 8. Moreover, in an embodiments where more than two wear indicators are used, such as three, four, or five wear indicators, each of the wear indicators may have different colors or patterns.

Figure 9:
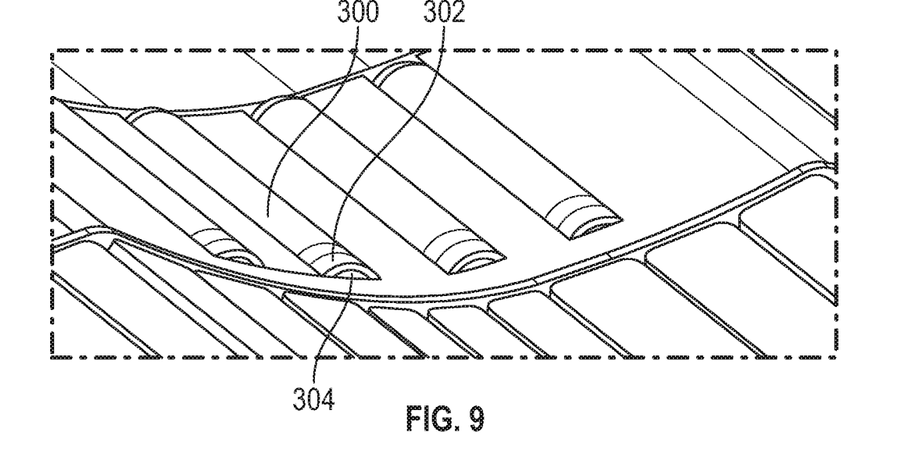
FIGS. 9 and 10 illustrate wear indicators of the shoe interface of FIG. 3, in accordance with examples of the present disclosure.
Figure 10:
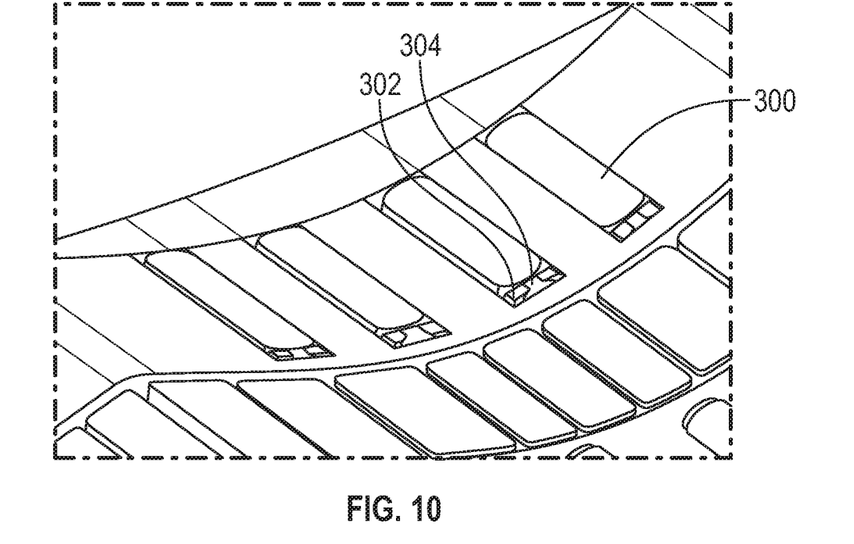

In an implementation, since each of the wear indicators 302 and 304 are formed of a material having a hardness that is less than a hardness of the body 300, as the body 300 erodes through the use of the shoe 100, each of the wear indicators 302 and 304 can erode at the same rate as the body 300. As noted above, in an implementation, the body 300 and the wear indicators 302 and 304 can erode during use of the shoe 100 due to friction that can occur between the shoe interfaces 202 and the component 102 caused by the shoe interface 202 contacting and moving over a surface of the component 102. The wear indicators 302 and 304 provide a visual indication to an operator of the shoe 100 of the wear status of the body 300 and the shoe interfaces 202. For example, if only the wear indicator 302 is visible, e.g., only the color green or the pattern 700 is visible, this serves as a visual indicator to the operator that the body 300 has not eroded to the point of no longer being serviceable. Thus, the shoe interfaces 202 do not need replacing. An implementation of only the wear indicator 302 being visible is shown with reference to FIG. 9. In an implementation, the wear indicator 302 erodes along with the body 300 during use of the shoe 100. In an implementation, if the wear indicator 304 is also visible, e.g., both the color green and the color red or both of the patterns 700 and 800 are visible since the wear indicator 302 has eroded to the point that the wear indicator 304 underneath the wear indicator is now exposed, this serves as a visual indicator to an operator of the shoe 100 that the body 300 has eroded and the shoe interfaces 202 should be replaced. An implementation of the wear indicators 302 and 304 both being visible is shown with reference to FIG. 10. Thus, during a visual inspection of the shoe 100, an operator can easily determine the state of the wear indicators 302 and 304 and, as a result, whether or not the shoe interfaces 202 should be replaced.

Returning attention to FIG. 2, the shoe 100 can include a probe 204 which is used to inspect the component 102. In an implementation, the probe 204 can be a NDT probe, such as an eddy current probe, a time-of-flight diffraction transducer (TOFD), a phased array sensor, an acoustic probe, or any other type of NDT sensor. During operation of the shoe 100, the probe 204 performs tests on the component 102, such as the aforementioned weld inspection, conductivity testing, surface inspection, or corrosion detection. In an implementation, when the shoe 100 inspects the component 102, the shoe interfaces 202 physically contact the component 102 and separate the probe 204 from a surface of the component 102. In an implementation, the probe 204 may be separated in a range between about 0.5 mm to 3.0 mm from a surface of the component 102.

The shoe 100 can also include impact protectors 206 and 208, which can function to protect the housing 200, the shoe interfaces 202, and the probe 204 during use of the shoe 100. The impact protectors 206 and 208 can be formed with a 3D printing procedure where the impact protectors 206 and 208 are formed from nylon. The impact protectors 206 and 208 can be formed using other techniques, such as casting, injection molding, or any other suitable technique. The impact protectors 206 and 208 can also be formed from any type of metal alloy, a thermoplastic, or any other type of rigid material.

As noted above, the shoe 100 can be used conduct various types of tests, inspections, and detections. For example, weld inspections can be performed by the shoe 100 where the probe 204 can employ ultrasonic NDT for subsurface testing on the component 102 while a complimentary eddy current method can be used to scan the surface for open surface cracks on weld caps and in heat affected zones of the component 102. Conductivity testing can be performed by the shoe 100 where the ability of the probe 204 to measure conductivity can be used to identify and sort ferrous and nonferrous alloys and verify heat treatment of the component 102. The shoe 100 can also be used to inspect for surface cracks in the component 102 using the probe 204. In implementations where the component 102 corresponds to a thin metal alloy, such as an aluminum aircraft skin, the shoe 100 may be employed for corrosion detection where the probe 204 can be used to detect and quantify corrosion on the inside of the thin metal alloy. Here, the probe 204 can be a low frequency probe and can be used to locate corrosion on second and third layers of metal that cannot be inspected ultrasonically. Moreover, in implementations where the component 102 corresponds to tubing, the shoe 100 can be used for in-line inspection of tubing at the manufacturing stage and field inspection of tubing where the probe 204 can be an eddy current probe.

Figure 11:
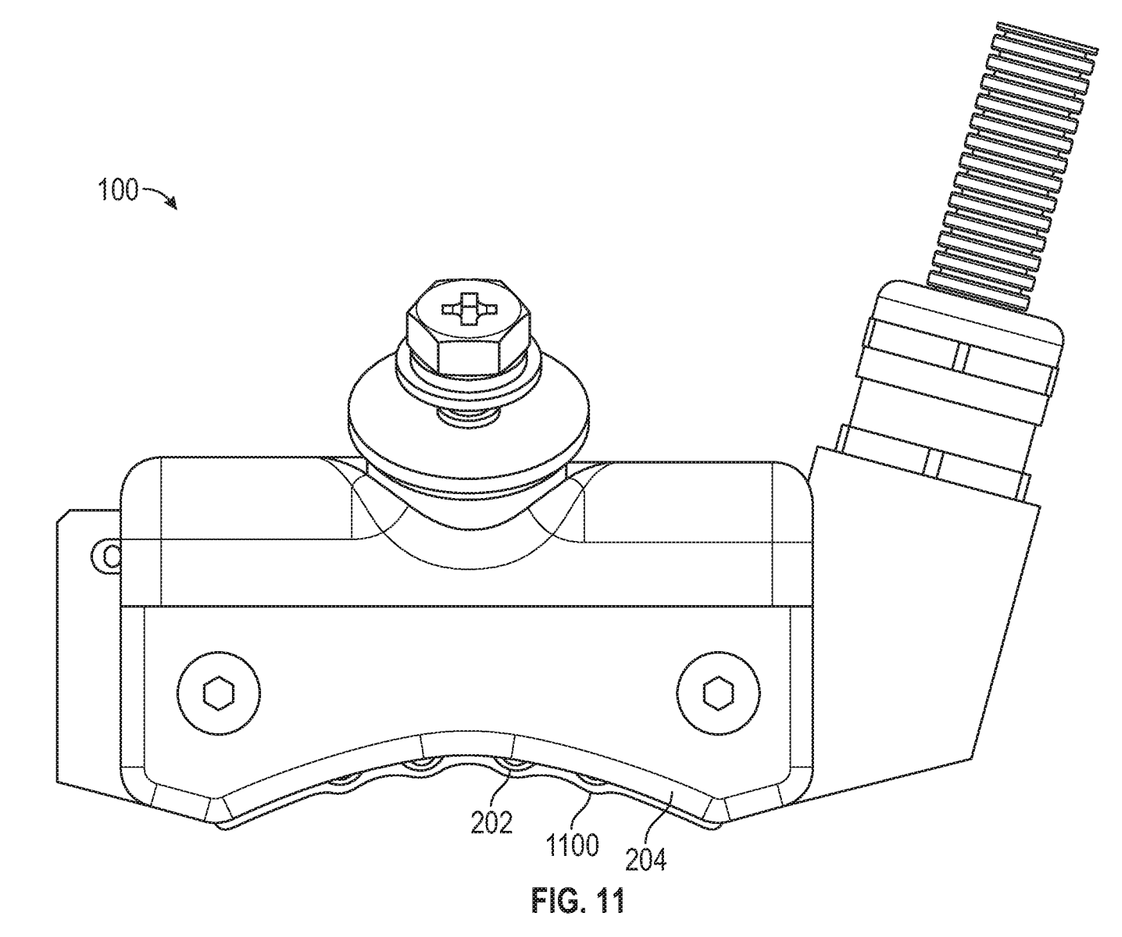
FIGS. 11-13 illustrate various configurations of a surface of the shoe shown with reference to FIG. 3, in accordance with examples of the present disclosure.

For the applications mentioned above, the shoe 100 may have various configurations that can allow for testing components having different configurations. For example, as discussed above, the component 102 has a circular configuration where the shoe 100 inspects an outer surface of the component 102. In this implementation, the shoe 100 has a curved surface 1100 as shown with reference to FIG. 11. In this implementation, the shoe 100 can include the shoe interfaces 202 disposed along the curved surface 1100. Moreover, the probe 204 can have a configuration that is similar to the curved surface 1100 such that the probe 204 may inspect a component, such as the component 102, during use of the shoe 100.

Figure 12:
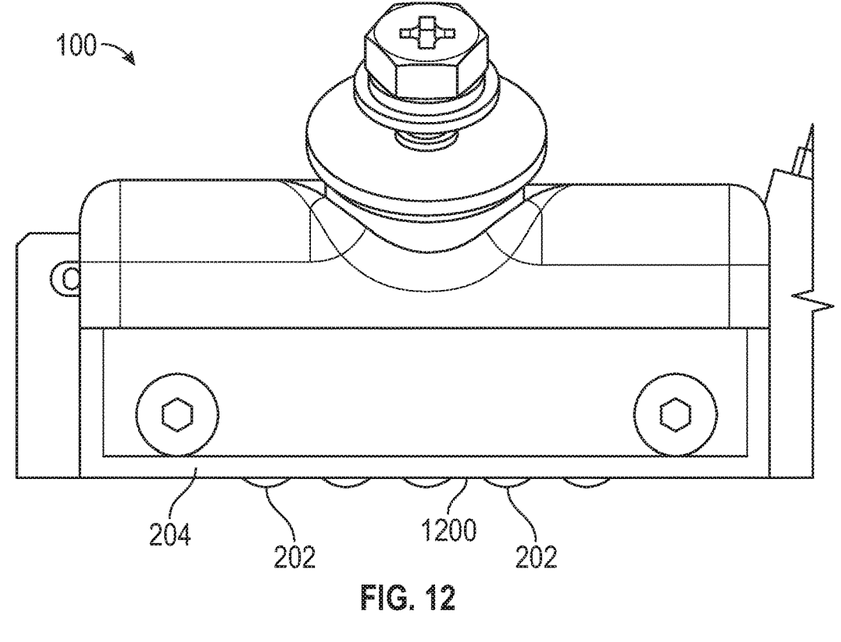

The shoe 100 may also have a flat configuration as shown with regards to FIG. 12. In particular, if the shoe 100 is used with a component having a substantially flat surface, the shoe 100 can include the surface 1200, which as shown with reference to FIG. 12, is substantially flat. In this configuration, the shoe interfaces 202 are disposed along the surface 1200 along with the probe 204 in order to facilitate use of the shoe 100 with a component having a flat surface.

Figure 13:
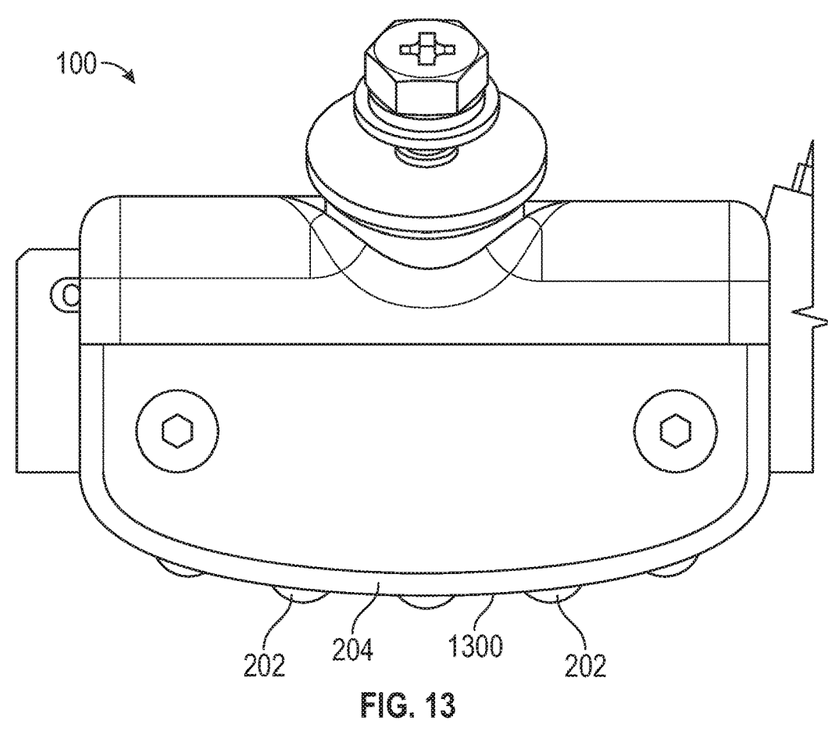

Furthermore, the shoe 100 may have a convex configuration, as shown with reference to FIG. 13. In this implementation, the shoe 100 includes a curved surface 1300 which allows the shoe 100 to have a convex configuration. In some implementations, a shoe having this configuration may be used to inspect an inside diameter of a tubular structure, such as a pipe, a pressure vessel, or the like. In this implementation, the shoe interfaces 202 are disposed about the curved surface 1300 such that the shoe interfaces 202 have the convex configuration. Likewise, the probe 204 can also have the convex configuration, as shown with regards to FIG. 13. Is should be noted that while the shoe 100 is shown having the configurations shown with reference to FIGS. 11-13, the shoe 100 is not limited to these configurations and other configurations are envisioned in accordance with implementations of the present disclosure.

The above detailed description includes references to the accompanying drawings, which form a part of the detailed description. The drawings show, by way of illustration, specific examples in which the invention can be practiced. These examples are also referred to herein as examples. Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms a or an are used, as is common n patent documents, to include one or more than one, independent of any other instances or usages of at least one or one or more. In this document, the term or is used to refer to a nonexclusive or, such that A or B includes A but not B, B but not A, and A and B, unless otherwise indicated. In this document, the terms including and in which are used as the plain-English equivalents of the respective terms comprising and wherein. Also, in the following claims, the terms including and comprising are open-ended, that is, a system, device, article, composition, formulation, or process that includes elements in addition to those listed after such a term in a claim are still deemed to fall within the scope of that claim. Moreover, in the following claims, the terms first, second, and third, etc. are used merely as labels, and are not intended to impose numerical requirements on their objects.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed:

1. A shoe for analyzing a component, the shoe comprising:
   a housing;
   a non-destructive testing (NDT) probe disposed on a side of the housing;
   a shoe interface disposed at the side of the housing, the shoe interface being configured to contact the component during the analyzing of the component while separating the NDT probe from the component during the analyzing of the component, the shoe interface being configured to move along the component;
   a first wear indicator having a configuration similar to the shoe interface and being configured to move along the component; and
   a second wear indicator having a configuration similar to the shoe interface and being configured to move along the component;
   wherein each of the shoe interface, the first wear indicator, and the second wear indicator have a cylindrical configuration;
   wherein the shoe interface, the first wear indicator, and the second wear indicator are concentric with each other; and
   wherein the first wear indicator is disposed about and covers the second wear indicator such that the second wear indicator is visible when the first wear indicator is worn away.

2. The shoe as recited in claim 1, further comprising an impact protector disposed at an end of the housing.

3. The shoe as recited in claim 1, wherein the NDT probe is an eddy current probe.

4. The shoe as recited in claim 1, wherein the NDT probe is an acoustic probe.

5. The shoe as recited in claim 1, wherein the first wear indicator indicates that the shoe interface is usable during analyzing of the component and the second wear indicator indicates that the shoe interface should be replaced.

6. The shoe as recited in claim 5, wherein the first wear indicator is a first pattern and the second wear indicator is a second pattern different from the first pattern.

7. The shoe as recited in claim 5, wherein the first wear indicator is a first color and the second wear indicator is a second color different from the first color.

8. The shoe as recited in claim 1, wherein a portion of the second wear indicator is visible when the shoe interface should be replaced.

9. The shoe as recited in claim 1, wherein the shoe interface is formed from a first material having a first hardness and each of the first wear indicator and the second wear indicator is formed from a second material having a second hardness that is less than the first hardness of the first material.

10. The shoe as recited in claim 9, wherein the first material is carbide and the second material is plastic.

11. A shoe for analyzing a component, the shoe comprising:
    a housing;
    a non-destructive testing (NDT) probe disposed at a side of the housing;
    a shoe interface disposed at the side of the housing, the shoe interface being configured to contact the component while separating the NDT probe from the component during the analyzing of the component, the shoe interface being configured to move along the component;
    a first wear indicator indicating that the shoe interface is usable during the analyzing of the component, the first wear indicator having a configuration similar to the shoe interface and being configured to move along the component; and
    a second wear indicator indicating that the shoe interface should be replaced, the second wear indicator having a configuration similar to the shoe interface and being configured to move along the component during the analyzing of the component;
    wherein each of the shoe interface, the first wear indicator, and the second wear indicator have a cylindrical configuration;
    wherein the shoe interface, the first wear indicator, and the second wear indicator are concentric with each other; and
    wherein the first wear indicator is disposed about and covers the second wear indicator such that the second wear indicator is visible when the first wear indicator is worn away.

12. The shoe as recited in claim 11, further comprising an impact protector disposed at an end of the housing.

13. The shoe as recited in claim 11, wherein the first wear indicator is a first color and the second wear indicator is a second color different from the first color.

14. The shoe as recited in claim 11, wherein the first wear indicator is a first pattern and the second wear indicator is a second pattern different from the first pattern.

15. The shoe as recited in claim 11, wherein a portion of the second wear indicator is visible when the shoe interface should be replaced.

16. The shoe as recited in claim 11, wherein the shoe interface is formed from a first material having a first hardness and each of the first wear indicator and the second wear indicator is formed from a second material having a second hardness that is less than the first hardness of the first material.

17. The shoe as recited in claim 16, wherein the first material is carbide and the second material is plastic.

18. A shoe for analyzing a component, the shoe comprising:
    a housing;

a non-destructive testing (NDT) probe disposed at a side of the housing;

a shoe interface disposed at the side of the housing, the shoe interface being configured to contact the component while separating the NDT probe from the component during the analyzing of the component, the shoe interface being configured to move along the component;

a first wear indicator indicating that the shoe interface is usable during the analyzing of the component, the first wear indicator having a configuration similar to the shoe interface and being configured to move along the component; and a second wear indicator indicating that the shoe interface should be replaced, the second wear indicator having a configuration similar to the shoe interface and being configured to move along the component during the analyzing of the component;

wherein:

each of the shoe interface, the first wear indicator, and the second wear indicator have a cylindrical configuration;

the shoe interface, the first wear indicator, and the second wear indicator are concentric with each other;

the first wear indicator is disposed about and covers the second wear indicator such that the second wear indicator is visible when the first wear indicator is worn away; and the shoe interface is formed from a first material having a first hardness and each of the first wear indicator and the second wear indicator is formed from a second material having a second hardness that is less than the first hardness of the first material.

19. The shoe as recited in claim 18, further comprising an impact protector disposed at an end of the housing.

20. The shoe as recited in claim 18, wherein the first wear indicator is a first color and the second wear indicator is a second color different from the first color.

21. The shoe as recited in claim 18, wherein a portion of the second wear indicator is visible when the shoe interface should be replaced.

22. The shoe as recited in claim 18, wherein the first wear indicator is a first pattern and the second wear indicator is a second pattern different from the first pattern.

23. The shoe as recited in claim 18, wherein the first material is carbide and the second material is plastic.

* * * * *